United States Patent [19]
Brookfield

[11] 3,886,789
[45] June 3, 1975

[54] VISCOMETER
[76] Inventor: Donald W. Brookfield, 168 Massapoag Ave., Sharon, Mass. 02067
[22] Filed: Aug. 31, 1973
[21] Appl. No.: 393,553

Related U.S. Application Data
[62] Division of Ser. No. 211,935, Dec. 27, 1971, abandoned.

[52] U.S. Cl. .................................. 73/59; 74/22 R
[51] Int. Cl. .......................................... G01n 11/16
[58] Field of Search ............................ 73/59, 60, 54

[56] References Cited
UNITED STATES PATENTS
2,398,574  4/1946  Bell .................................. 73/59
2,679,750  6/1954  Brookfield ......................... 73/59
3,169,392  2/1965  Brookfield ......................... 73/59

Primary Examiner—Richard C. Queisser
Assistant Examiner—Joseph W. Roskos

[57] ABSTRACT

A viscometer is disclosed having a chamber, a motor, and first and second tubular shaft sections driven by the motor. The second tubular section is movable axially relative to the first section and extends into the chamber through a seal. A shaft extends through the tubular sections and is rotatable independently thereof. A drag member attached to the shaft is exposed in the chamber for sensing viscosity.

5 Claims, 3 Drawing Figures

VISCOMETER

BACKGROUND REFERENCE

Schaum's Outline Series, "Lagranean Dynamics," Chapter VI.

BACKGROUND OF THE INVENTION

The present invention relates to low friction mechanisms and to viscometers incorporating the same and is a division of my co-pending application, Ser. No. 211,935, filed Dec. 27, 1971 now abandoned.

While in my mechanisms, friction can be effectively countered in one way or another, in other mechanisms it makes desired sensitivity and accuracy unattainable. One example of devices where friction imposes such undesirable limitations are viscometers where a member, running in a shaft seal, for example, is rotated in the liquid by means of a torsional drive which is rotated in the liquid by means of a torsional drive which yields as the viscosity increases and advances as it decreases with such relative movements being measured to provide information as to viscosity. The lower the viscosity, the more friction interferes with sensitivity of viscosity measurements.

THE PRESENT INVENTION

The general objective of the present invention is to enable frictional problems to be countered in mechanisms of which viscometers are but one example. In accordance with the invention, this objective is attained by providing a friction-countering mechanism comprising a first member, a second member in contact with the first member but movable relative thereto with attendant friction, together with means to apply a major force to one member to move it in a path relative to the other member and with means to apply a relatively negligible force to said other member at an angle to the path thereby producing a path displacement in the direction of the negligible force which is a resultant of the two forces.

By way of example, a shaft member is connected to another member in a friction producing relationship, the second named member is a bearing on a shaft seal, the mechanism means to rotate at least one of the members and at the same time to reciprocate one member axially relative to the other.

Another objective of the invention is to provide, where the mechanims consists of two friction producing members connected to the shaft member, that the two members are also reciprocated towards and away from each other to prevent any axial movement of the shaft member.

Another objective of the invention is to provide a viscometer in which the drive includes a tubular member positively driven by the motor, the tubular member including a section connected thereto for axial movement relative thereto and extending into the chamber for the liquid. The torsionally driven member extends through the tubular member, the axially movable section of which having a shaft seal through which the torsionally driven member extends. Means are provided to reciprocate the axially movable section and the means may be driven by the viscometer motor.

Yet another objective of the invention is the provision in such a viscometer of a second tubular member in alignment with the tubular member of the drive and extending into the chamber and supported for axial movement. The second tubular member also has a shaft seal through which the torsionally driven member extends and means are employed to axially reciprocate the second tubular member, the tubular members moving first towards and then away from each other thereby to relieve the torsionally driven member from end thrust.

THE PREFERRED EMBODIMENTS OF THE INVENTION

In the accompanying drawings, there are shown embodiments of the invention illustrative of these and other of its objectives, novel features, and advantages.

Figure 1:
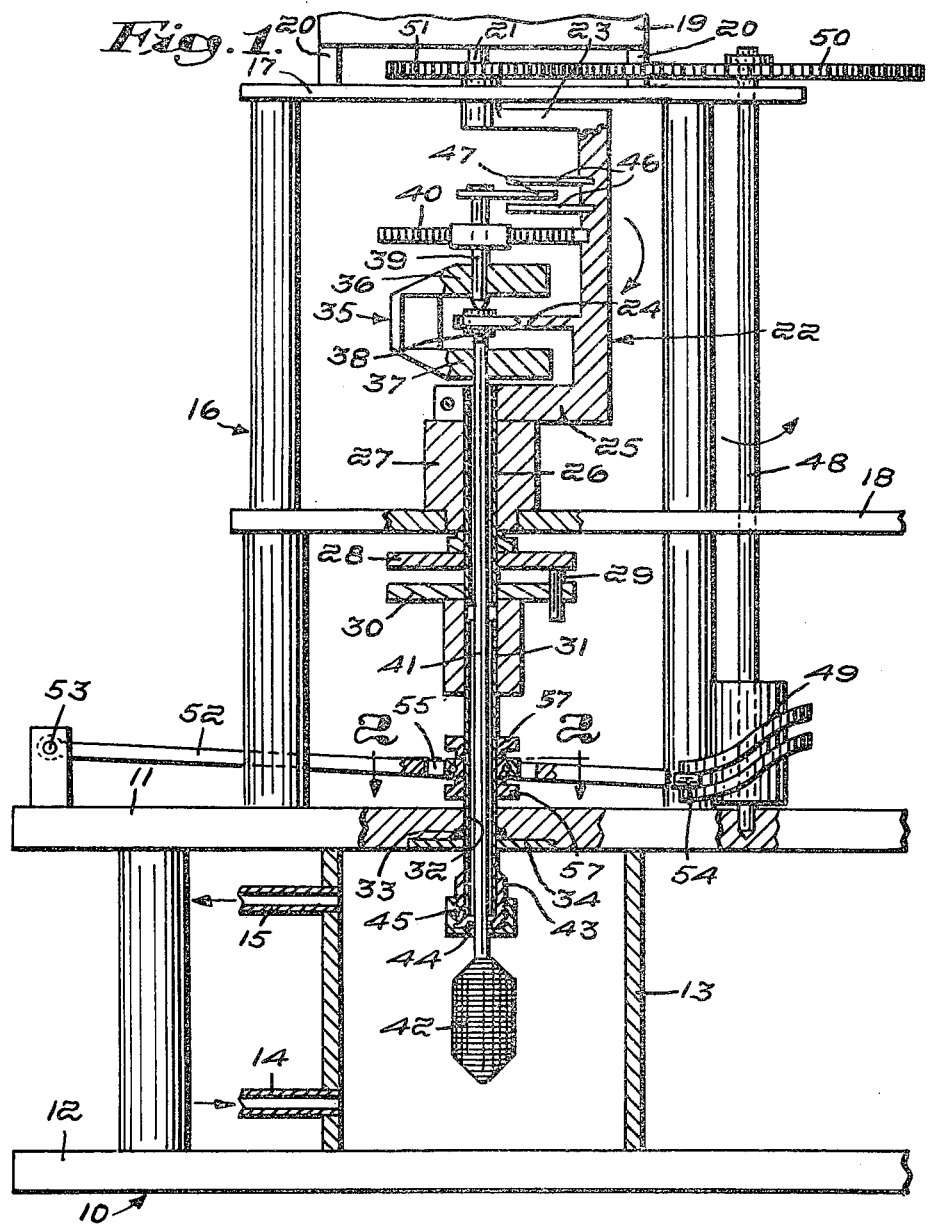
FIG. 1 is a partly sectioned, fragmentary side view of a viscometer in accordance with the invention.
Figure 2:
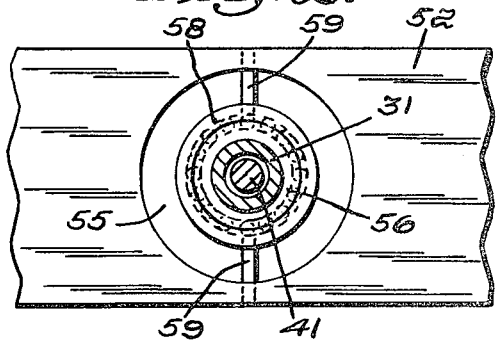
FIG. 2 is a section, on an increase in scale, taken approximately along the indicated lines 2—2 of FIG. 1.

The viscometer illustrated by the drawings is shown as having a base, generally indicated at 10, including top and bottom walls 11 and 12, respectively, closing the ends of a chamber 13 having an inlet 14 and an outlet 15 for the liquid the visosity of which is to be measured.

Framework, generally indicated at 16, is attached to the base 10 and includes vertically spaced, transverse supports 17 and 18. An electric motor 19 is secured to the support 17 by mounts 20 with its shaft 21 downwardly disposed. A connector, generally indicated at 22, has vertically spaced parallel arms 23, 24, and 25. The end of the arm 23 is fast on the shaft 21 and the end of the arm 25 is fixed on the upper end of the upper section 26 of a tubular shaft in vertical alignment with the motor shaft 21 and supported by a bearing 27 fixed on the support 18.

The shaft section 26 has a disc 28 fixed on its lower end and having a downwardly disposed pin 29 slidably entered in a vertically aligned hole in a flanged sleeve 30 fixed on the lower section 31 of the tubular shaft and receiving the lower end of the shaft section 26. The shaft section 31 extends through a bore 32 in the top wall 11 of the base 10 and into the chamber 13 through an annular seal 33 held in place by a retainer 34.

A connector, generally indicated at 35, includes upper and lower parallel arms 36 and 37, the arm 36 above and the arm 37 below the arm 24 of the connector 22. The arm 24 has a bearing 38 in support of a shaft section 39 fast in the arm 36 and in vertical alignment with the motor shaft 21. The center of a coil spring 40 is connected to the shaft section 39 and its outer end is attached to the connector 22. A shaft section 41 is supported by the arm 37 of the connector 35 with its upper end in engagement with the bearing 38. The shaft section 41 extends downwardly through the sections 26 and 31 of the tubular shaft and into the chamber 13 where it is provided with a drag 42. A cap 43 on the lower end of the tubular shaft section 31 carries an annular seal 44 for the shaft section 41, the seal 44 being held in place by a retainer 45 threaded on the cap 43.

From the foregoing, it will be apparent that the spring 40 provides a torsional driving connection between the motor driven connector 22 and the connector 35. Assuming that bearing and seal friction is not a factor, the viscosity of the liquid in the chamber 13 affects the turning of the drag 42 with the spring 40 yielding as the viscosity increases and expanding as the viscosity decreases. The relationship between the driving members and the members responsive to the viscosity of the liquid may be measured in various ways and is shown, for convenience, as measured by means of a condenser having horizontal plates 46 carried by the connector 22 and a plate 47 disposed between them and fixed on the upper end of the shaft section 39.

Because bearings and shaft seals do present frictional problems affecting viscometer sensitivity and accuracy, the viscometer is provided with means substantially to nullify their frictional effects. In accordance with the invention, a vertically disposed shaft 48, journalled in the top of the base 10 and the supports 17 and 18, has a cam 49 at its lower end and while it may be otherwise driven, it has a gear 50 on its upper end in mesh with a gear 51 of the motor shaft 21, the ratio between the shaft 48 and the motor shaft being other than one to one and desirably providing for relatively slow rotation of the shaft 48.

One end of an arm 52 is pivotally connected as at 53 to the top wall of the base 10 and its other end is provided with a cam follower 54. The arm 52 has a central opening 55 through which the lower section 31 of the tubular shaft extends. The shaft section 31 has a ball bearing unit 56 held between retainers 57 and provided with a ring 58 within the opening 55 and connected to the arm 52 by pivots 59.

Figure 3:
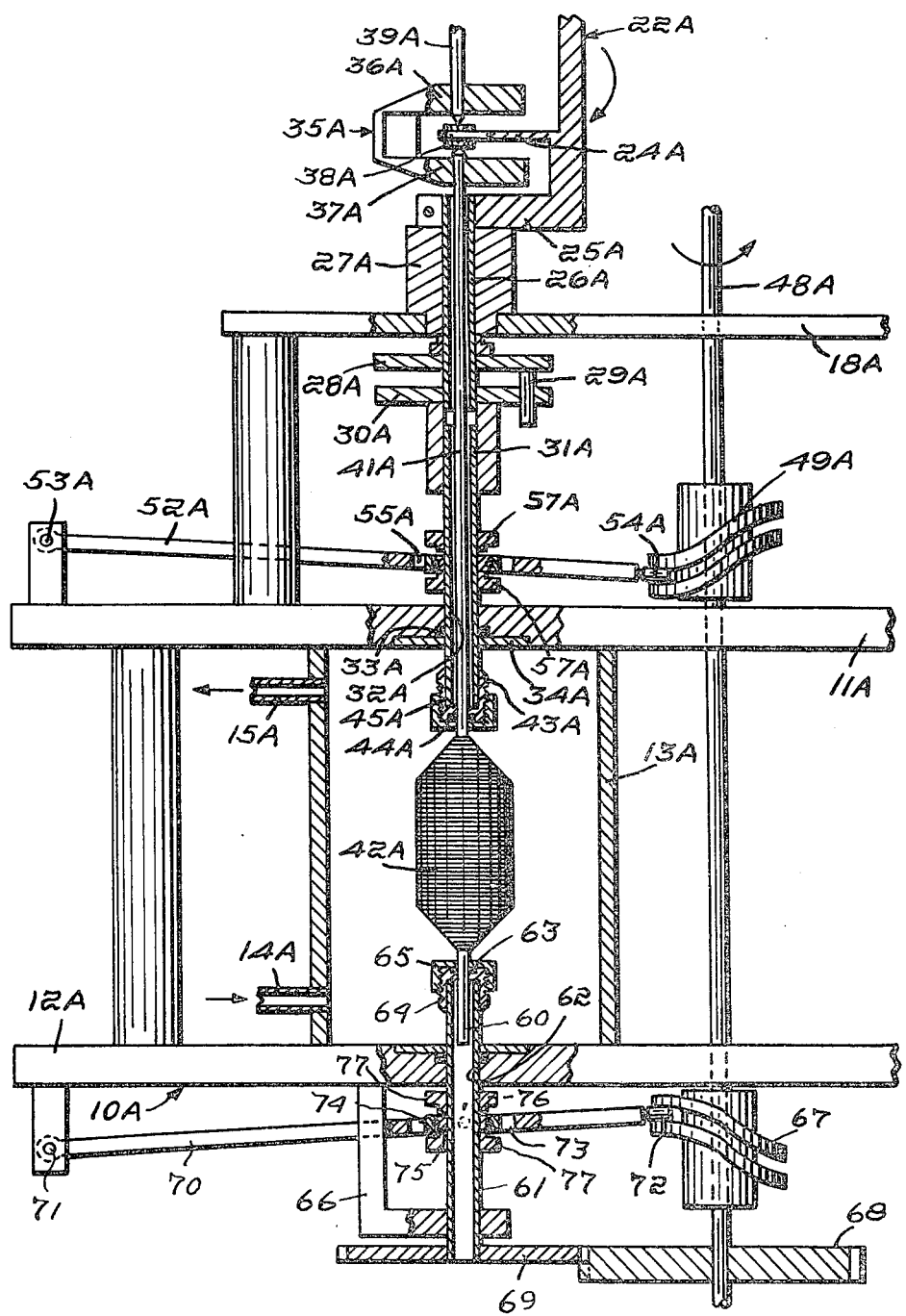
FIG. 3 is a fragmentary and partly sectioned side view of a viscometer in accordance with another embodiment of the invention.

With the viscometer as thus disclosed, the lower section 31 of the tubular shaft is raised and lowered as it is turned while the shaft 41 is supported against axial movement in either direction by the bearing 38. As a consequence of the relative axial and rotative movements, the frictional effect of the seal 44 is effectively nullified.

Where greater sensitivity is required in the response of the viscometer to viscosity changes, air bearings may be used for the support of the shaft 41 as may the arrangement disclosed in the embodiment of the invention illustrated by FIG. 3 which, as shown, is similar to that previously disclosed. As a consequence, corresponding parts are designated by the suffix addition "A" to the appropriate reference numerals and will not again be described.

The drag 42A includes a stub shaft 60 in axial alignment with the shaft 41A. A tubular shaft 61 extends upwardly into the chamber 13A through a bore 62 in the wall 10A in axial alignment with the stub shaft 60 which extends downwardly into the shaft 61 and through a shaft seal 63 carried by a cap 64 on the shaft 61 and held in place by a retainer 65. The wall 12A is provided with a depending holder 66 slidably supporting the lower end portion of the shaft 61.

In this embodiment of the invention, the shaft 48A extends downwardly through the walls 11A and 12A and is provided with a second cam 67, the complement of the cam 49A and a gear 68 in mesh with a gear 69 fast on the shaft 61. One end of an arm 70 is pivotally connected as at 71 to the plate 12A and its other end is provided with a cam follower 72 in operative engagement with the second cam 67. The arm 70 has a central opening 73 through which the shaft 61 extends and to which the ring 74 of the ball bearing unit 75 is connected by pivots 76, the ball bearing unit 75 being held in place by retainers 77.

With this arrangement, when the viscometer is in operation, the shaft sections 31A and 61 are reciprocated towards and away from each other while the former and the shafts 41A and 60 are rotating thereby to minimize axial thrust in either direction on the shaft 41A.

It will be appreciated from the foregoing that the invention makes possible bearing and seal arrangments in a wide range of mechanisms with a viscometer being but one example, the sensitivity of which arrangements being independent of friction.

I claim:

1. A viscometer comprising a chamber, a motor, means positively driven by said motor and including first and second tubular shaft sections, means interconnecting said shaft sections in axial alignment with said second section axially movable relative to the first section, said second section extending into said chamber, said chamber provided with a seal through which said second section extends and relative to which said second section is slidable and rotatable, a shaft extending through said tubular section and rotatable independently thereof, a torsional connection between said shaft and said positively driven means outside said chamber, said shaft including a drag exposed in said chamber, a seal through which said shaft extends and carried by said second section, and means to reciprocate said second section.

2. The viscometer of claim 1 in which the reciprocating means is driven by the motor.

3. The viscometer of claim 1 in which the positively driven means includes an axial bearing above the other of the shaft sections and the shaft includes a connector provided with vertically spaced axially aligned bearings engaging portions receiving the bearing between them.

4. The viscometer of claim 1 in which there is a second tubular shaft section in vertical alignment with the other shaft sections and slidably entrant of the chamber opposite the first named chamber-entering section, the drag includes a stub shaft entrant of the second tubular section, a seal carried by the second slidable section receives the stub shaft, and means to reciprocate the second section, the reciprocating means being interconnected to provide that the chamber-entering sections are moved axially towards and away from each other.

5. The viscometer of claim 4 in which the second named chamber-entering section is also rotatable and includes a driving connection with the reciprocating means.

* * * * *